(No Model.)

J. McDONNELL.
BAIL EAR FOR PAILS.

No. 344,667. Patented June 29, 1886.

Witnesses:
Chas. R. Burr
A. F. Stuart

Inventor:
James McDonnell
by Church & Church
his Attorneys

N. PETERS, Photo-Lithographer, Washington, D. C.

UNITED STATES PATENT OFFICE.

JAMES McDONNELL, OF SCRANTON, PENNSYLVANIA.

BAIL-EAR FOR PAILS.

SPECIFICATION forming part of Letters Patent No. 344,667, dated June 29, 1886.

Application filed March 8, 1886. Serial No. 194,476. (No model.)

*To all whom it may concern:*

Be it known that I, JAMES MCDONNELL, of Scranton, in the county of Lackawanna and State of Pennsylvania, have invented certain new and useful Improvements in Bail-Ears for Pails; and I do hereby declare the following to be a full, clear, and exact description of the same, reference being had to the accompanying drawings, forming a part of this specification, and to the figures and letters of reference marked thereon.

My invention has for its object to combine with the ears applied to dinner-pails and similar vessels for the attachment of the bail or handle a lock or catch for fastening the cover securely in position and preventing its accidental displacement; and it consists in a certain improved construction, which I will now proceed to describe, and point out the particular features of novelty in the claims at the end of this specification.

Figure 1:
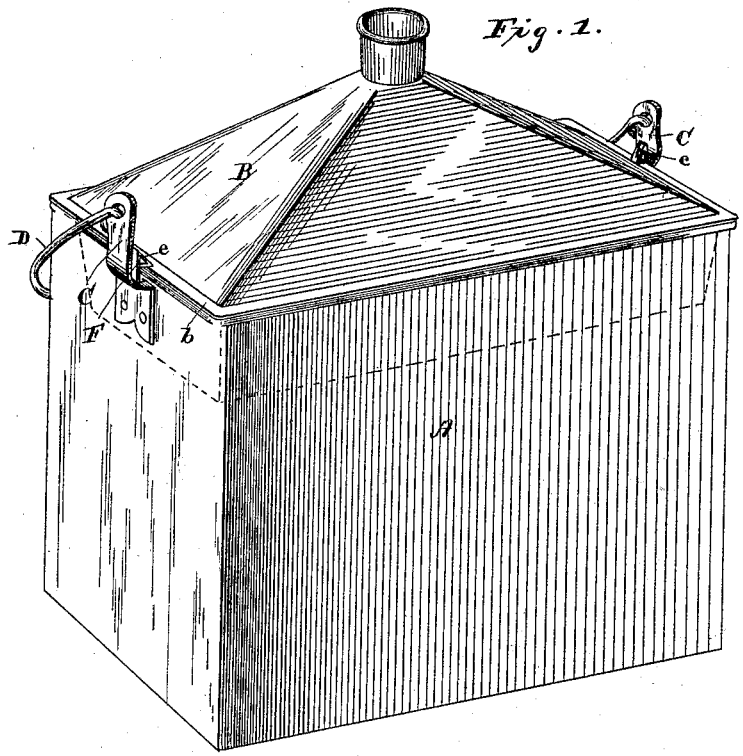
Figure 2:
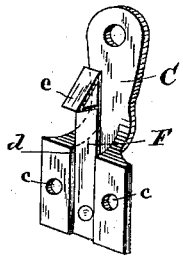
Figure 3:
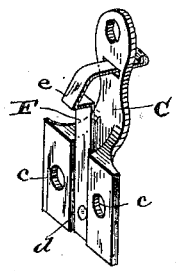
Figure 4:
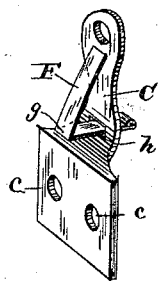
Figure 5:
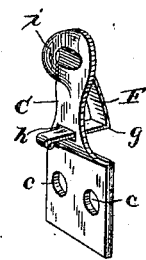

In the drawings, Figure 1 is a perspective view of a dinner-pail with my invention applied thereto. Fig. 2 is a perspective view of a preferred form of bail-ear. Figs. 3, 4, and 5 are similar views of modifications.

Similar letters of reference in the several figures indicate the same parts.

A represents the body of an ordinary metal dinner-pail, and B the lid thereof, constructed preferably with a receptacle in it for coffee or other liquid, as shown in dotted lines, and having the flange or rim $b$, as shown.

C C represent the two ears to which the ends of the bail or handle are connected, each constructed preferably as shown in Fig. 2—that is, having the broad lower portion, in which are two or more perforations, $c$, for the rivets used in fastening the ears to the pail, and the narrowed upper portion, bent outward slightly, and having the perforations through which the ends of the bail D pass. A slight vertical groove, $d$, is provided in the lower portion of the ear, in which is secured in any suitable manner a small leaf-spring, F, pressing inwardly, and having the inclined projection and shoulder $e$ at its upper end. The lower edge of the shoulder $e$ is slightly above the level of the top of the pail, and, when the spring is in normal position, projects over the edge, so that when the lid is placed upon the pail the rim or flange $b$ presses back the spring-catches in the ears, and, passing beneath the shoulders, becomes engaged therewith, and thus the lid is prevented from being accidentally displaced. If desired, the end of the spring may be extended outward through a slot in the side of the ear, so that the spring may be retracted from the outside, as shown in Fig. 3.

In Fig. 4 I have shown a modification of my invention, in which the spring F is fastened to the ear above the top of the pail, and is bent downward, and again at right angles, forming the shoulder $g$, and passes through a small transverse slot, $h$, in the ear, so that its end may be grasped and operated from the outside to release the lid and permit its removal. The flange or rim on the lid operating on the inclined surface of the spring presses it backward until the shoulder $g$ is reached, when it springs forward and locks the lid in position.

In Fig. 5 is shown a modified form of ear, having a spring somewhat similar to that in Fig. 4, but in which the perforation in which the bail is secured is in a lug, $i$, secured to the side of the bail.

The advantages of my invention are obvious. The lid or cover of the pail is fastened securely in position without the catches being placed at front and rear, as heretofore, or without the lid being hinged to the body of the pail. The catches are out of sight, simple in their construction and automatically operated, and can be made very cheaply.

Instead of employing two catches—one on each ear—I may provide a suitable lug on one ear, under which the rim of the lid is placed, and one catch on the other ear, the application and removal of the lid being accomplished in an obvious manner.

I claim as my invention—

1. The combination, with a pail and its lid, of an ear or lug for the attachment of the bail or handle, and a spring-catch on said bail-ear for locking the lid on the pail, substantially as described.

2. The combination, with a pail and the lid thereof, of the ears or lugs mounted upon the pail for the attachment of the bail or handle, and the spring-catches on said ears adapted to engage the lid of the pail and fasten it securely in position, substantially as described.

3. The combination, with the pail, of the ears or lugs secured on each side thereof for the attachment of the bail or handle, each having the groove therein, and the spring secured in said groove, and having a projection or shoulder for engaging with the lid of the pail and locking it in position.

4. As a new article of manufacture, a bail-ear for pails, having a spring-catch mounted thereon for engaging the lid of the pail and fastening it securely in position, substantially as described.

JAMES McDONNELL.

Witnesses:
A. B. WILLIAMS,
EDWARD KEEFE.